United States Patent
Wang et al.

(10) Patent No.: US 11,505,082 B2
(45) Date of Patent: Nov. 22, 2022

(54) CHARGING DEVICE FOR ELECTRIC VEHICLES AND AUTOMATIC TROBLESHOOTING METHOD THEREOF

(71) Applicant: Noodoe Corporation, Taipei (TW)

(72) Inventors: John C. Wang, Taipei (TW); Chia-Ssu Wu, Taipei (TW)

(73) Assignee: NOODOE CORPORATION, Taipei (TW)

( * ) Notice: Subject to any disclaimer, the term of this patent is extended or adjusted under 35 U.S.C. 154(b) by 179 days.

(21) Appl. No.: 17/024,775

(22) Filed: Sep. 18, 2020

(65) Prior Publication Data

US 2021/0086653 A1  Mar. 25, 2021

(30) Foreign Application Priority Data

Sep. 19, 2019 (TW) ................. 108133715

(51) Int. Cl.
| | | |
|---|---|---|
| *B60L 53/68* | (2019.01) | |
| *H04W 76/19* | (2018.01) | |
| *B60L 53/302* | (2019.01) | |
| *H02J 7/00* | (2006.01) | |
| *B60L 53/60* | (2019.01) | |

(52) U.S. Cl.
CPC ............. *B60L 53/68* (2019.02); *B60L 53/302* (2019.02); *B60L 53/60* (2019.02); *H02J 7/00032* (2020.01); *H04W 76/19* (2018.02)

(58) Field of Classification Search
CPC ........ B60L 53/68; B60L 53/302; B60L 53/60; H02J 7/00032; H04W 76/19
USPC ......................................................... 320/109
See application file for complete search history.

(56) References Cited

U.S. PATENT DOCUMENTS

| | | | |
|---|---|---|---|
| 11,186,191 B2 * | 11/2021 | Lo ........................... | B60L 53/16 |
| 2011/0213656 A1 * | 9/2011 | Turner ................... | G06Q 30/00 320/109 |
| 2018/0186245 A1 * | 7/2018 | Diaz ....................... | B60L 53/14 |
| 2018/0293864 A1 * | 10/2018 | Wedig .................... | G08B 13/22 |

FOREIGN PATENT DOCUMENTS

| | | | | |
|---|---|---|---|---|
| EP | 3684084 A1 * | 7/2020 | ............... | B60L 3/00 |
| WO | WO-2019054535 A1 * | 3/2019 | ............... | B60L 3/00 |

* cited by examiner

*Primary Examiner* — Richard Isla
*Assistant Examiner* — Manuel Hernandez
(74) *Attorney, Agent, or Firm* — McClure, Qualey & Rodack, LLP

(57) ABSTRACT

Automatic troubleshooting method is provided for a charging device of an electric vehicle. The operation of the charging device is monitored, and when an abnormal situation specified by a predetermined abnormal situation definition is detected, a troubleshooting procedure corresponding to the predetermined abnormal situation definition is performed automatically.

14 Claims, 4 Drawing Sheets

CHARGING DEVICE FOR ELECTRIC VEHICLES AND AUTOMATIC TROBLESHOOTING METHOD THEREOF

BACKGROUND OF THE INVENTION

Field of the Invention

The disclosure relates generally to charging devices of electric vehicles, and, more particularly to automatic troubleshooting methods that can perform related automatically troubleshooting for charging devices of electric vehicles.

Description of the Related Art

Recently, with the rising awareness of environmental protection and electric vehicle technology advances, the development of electric vehicles powered by electrical energy to replace traditional vehicles powered by fossil fuels has gradually become an important goal in the automotive field, thus making electric vehicles become more and more popular. In order to increase the range and willingness to use electric vehicles, many countries or cities have begun to set up charging stations in public places to provide electricity to electric vehicles, and have also begun to plan the deployment of a large number of charging stations in urban areas or scenic areas, so as to make the charging of electric vehicles more convenient.

In order to provide convenient cashless payment and other services, and reduce the setting cost of charging stations, charging stations usually connect to remote servers through the Internet or other network connection, so as to use the computing functions of the servers and use cloud database to perform charging services. According to the traditional technology, the remote server must periodically send messages to the charging station to confirm whether the connection of the charging station is normal. However, when the connection between the charging station and the server is interrupted, the server can't control the charging station from the remote end, nor can it assist the charging station to eliminate the network interruption and other faults from the remote end. Instead, the maintenance personnel must actually arrive at the charging station for troubleshooting to return the charging station to the normal operation. Due to the need to send personnel to the charging station for troubleshooting, the time for the charging station to stop service is extended, resulting in increased maintenance costs and inconvenience in use.

BRIEF SUMMARY OF THE INVENTION

Automatic troubleshooting methods for a charging device of an electric vehicle and charging devices of an electric vehicle are provided, which can enable the charging device to detect the network interruption and other fault conditions by itself, and when a network connection between the charging device and a server is interrupted, the charging device can automatically eliminate the network interruption and other fault conditions by itself, such that the charging device can return to normal operation, and the situation that the maintenance personnel actually arrive at the charging station for troubleshooting can be greatly reduced. It can greatly reduce the need to actually send personnel to the charging station for troubleshooting, thus shortening the stopping service time for the charging device, reducing the maintenance cost and increasing the convenience of use.

In an embodiment of an automatic troubleshooting method for a charging device of an electric vehicle, an operation of the charging device is first detected and a troubleshooting procedure corresponding to the predetermined abnormal situation definition is automatically performed when an abnormal situation specified by a predetermined abnormal situation definition is detected.

An embodiment of a charging device of an electric vehicle comprises: a network connection unit configured to enable the charging device to remotely connect to a charging management server through a network connection; a storage unit storing predetermined abnormal situation definition and troubleshooting procedures corresponding thereto; and a processor configured to perform an automatic troubleshooting method, that is, detecting an operation of the charging device and automatically performing a troubleshooting procedure corresponding to a predetermined abnormal situation definition when an abnormal situation specified by the predetermined abnormal situation definition is detected.

In some embodiments, wherein the method further comprises detecting the operation of the network connection unit, and when detecting that the network connection is interrupted, enabling the network connection unit to perform a network connection establishment procedure to re-establish the network connection.

In some embodiments, wherein the method further comprises when detecting that the network connection is interrupted and the network connection has not been restored after the network connection unit has performed the network connection establishment procedure, clearing temporary network information of the network connection unit and enabling the network connection unit to perform the network connection establishment procedure again after clearing the temporary network information of the network connection unit.

In some embodiments, wherein the method further comprises when detecting that the network connection is interrupted and the network connection has not been restored after the network connection unit has performed the network connection establishment procedure, enabling the charging device to perform a rebooting procedure.

In some embodiments, wherein the method further comprises detecting the operation of the network connection unit, and when detecting that the network connection is interrupted, enabling the charging device to perform a cooling procedure first and then enabling the network connection unit to perform a network connection establishment procedure to re-establish the network connection.

In some embodiments, wherein the method further comprises detecting the operation of the network connection unit, and when detecting that the network connection is not interrupted but the network connection unit can't be remotely connected to the charging management server, enabling the network connection unit to perform a server connection procedure to establish a connection with the charging management server.

In some embodiments, wherein the method further comprises detecting the operation of the network connection unit, and when detecting that the network connection is not interrupted and the network connection unit still can't be remotely connected to the charging management server after the network connection unit has performed the server connection procedure, clearing temporary network information of the network connection unit and enabling the network connection unit to reperform the server connection procedure again to establish the connection with the charging management server after clearing the temporary network information of the network connection unit.

In some embodiments, wherein when detecting that the network connection is not interrupted and the network connection unit still can't be remotely connected to the charging management server after the network connection unit has performed the server connection procedure, rebooting the charging device.

Automatic troubleshooting methods for a charging device of an electric vehicle may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Embodiments of the invention provide charging devices and related automatic troubleshooting method, which can be applied to the environment where the charging device is connected to a remote server through the Internet to perform charging service with the help of the computing function of the server and the database on the cloud. According to automatic troubleshooting method of the invention, when the network connection of the charging device such as the charging station is interrupted, it is not necessary for the maintenance personnel to actually arrive at the charging station for troubleshooting, but the charging device itself can perform the automatic troubleshooting method to restore the charging device to normal operation, which can effectively reduce the failure due to the network connection interruption of the charging device or the remote connection with the server, thus improving the user's experience, increasing the user's willingness to use related electric vehicle charging services, and further increasing the revenue of charging device and reducing the service interruption time of charging device.

Figure 1:
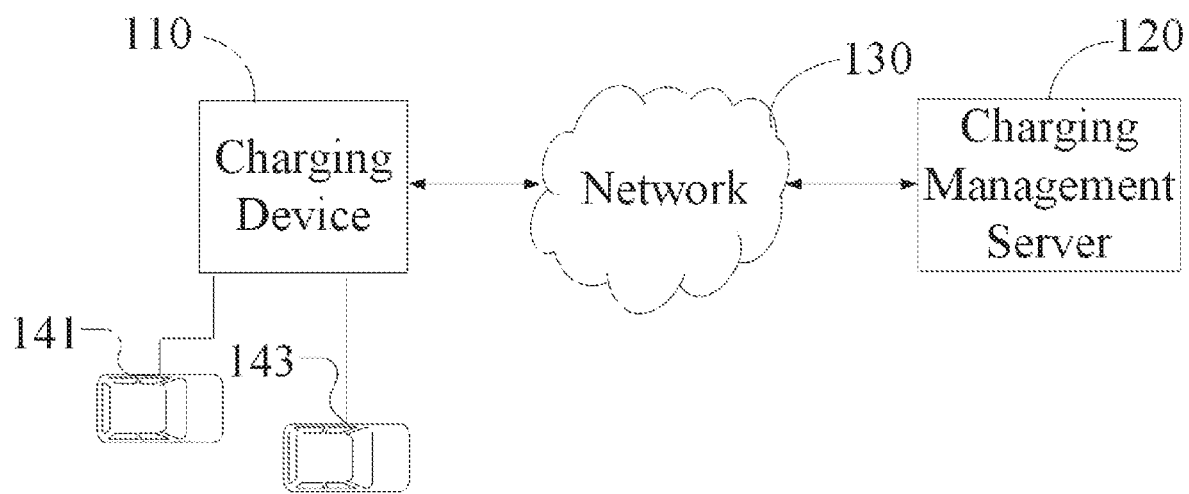
FIG. 1 is a schematic diagram illustrating an embodiment of an environment suitable for a charging device of the invention.

FIG. 1 is a schematic diagram illustrating an embodiment of an environment suitable for a charging device of the invention. As shown in FIG. 1, a charging device 110 of the present invention is remotely connected to a charging management server 120 via a network 130.

In some embodiments, the network 130 may be a wired network, a telecommunication network, and a wireless network, such as a Wi-Fi network or the like.

The charging management server 120 of the invention can be any processor-based electronic device, which may comprise at least a storage unit, a network connection unit, and a processor not shown in FIG. 1. It is noted that, the charging management server 120 can perform charging management operations of the charging device 110. The charging management operations may include charging management and reservation scheduling management of the charging device 110 and related payment operations. For example, in one embodiment, the charging management server 120 may receive a charging request from a user terminal (not shown in FIG. 1), and after completing the charging confirmation and payment confirmation according to the charging request, it generates a charging authorization instruction and transmits it to the charging device 110 via the network 130, so as to allow the charging device 110 to output power to an electric vehicle (for example, an electric scooters or an electric car) which is electronically connected to the charging device 110 or prohibit the charging device 110 from outputting power to the electric vehicle. For example, in another embodiment, the charging management server 120 may receive a charging reservation request from the user terminal, and after completing the charging reservation and payment confirmation according to the charging reservation request, it generates a charging authorization instruction and transmits it to the charging device 110 via the network 130, so as to allow the charging device 110 to output power starting at a certain time to an electric vehicle (for example, an electric scooters or an electric car) which is electronically connected to the charging device 110 or prohibit the charging device 110 from outputting power to the electric vehicle. For example, the charging device 110 may be an electric vehicle charger or a charging station, which is provided with a single charging connector or multiple charging connectors, and output electric power to charge the electronic vehicle through the charging connector(s). For example, in FIG. 1, the charging device 110 has two charging connectors, which are utilized to charge the electric vehicle 141 and the electric vehicle 143, respectively.

The charging device 110 performs the automatic troubleshooting method of the invention. In one embodiment, the charging device 110 detects its own operating situations, and when an abnormal situation that meets the predetermined abnormal situation definition is detected, it automatically performs the troubleshooting procedure corresponding to the detected abnormal situation definition.

The charging device 110 may further include a network connection unit (not shown in FIG. 1). The network connection unit is configured to enable the charging device 110 to remotely connect to the charging management server 120 via the network 130.

In an embodiment of the invention, the automatic troubleshooting method performed by the charging device 110 is to detect the operation of the network connection unit, and when detecting that the network connection is interrupted, the network connection unit is enabled to perform a network connection establishment procedure to re-establish the network connection. When detecting that the network connection is interrupted and the network connection has not been restored after the network connection unit has performed the network connection establishment procedure, temporary network information of the network connection unit is cleared first and then the network connection unit is enabled to reperform the network connection establishment procedure again after clearing the temporary network information of the network connection unit. If the network connection still has not been restored after the temporary network information of the network connection unit has cleared and the network connection establishment procedure has reperformed, the charging device 110 is enabled to perform a rebooting procedure.

In an embodiment of the invention, when it is detected that the network connection is interrupted, if the network connection unit is overheated, the charging device 110 performs the cooling procedure first and then enables the network connection unit to perform the network connection establishment procedure to re-establish the network connection.

In an embodiment of the invention, when it is detected that the network connection is not interrupted but the network connection unit can't remotely connect to the charging management server, the network connection unit is enabled to perform a server connection procedure to establish a connection with the charging management server 120. When detecting that the network connection is not interrupted and the network connection unit still can't remotely connect to the charging management server 120 after the network connection unit has performed the server connection procedure, temporary network information of the network connection unit is cleared first and then the network connection unit is enabled to reperform the server connection procedure again after clearing the temporary network information of the network connection unit. Or, when it is detected that the network connection is not interrupted but the network connection unit can't remotely connect to the charging management server 120 and if the network connection unit still can't remotely connect to the charging management server 120 after the network connection unit has performed the server connection procedure, the charging device 110 is enabled to perform a rebooting procedure.

Figure 2:
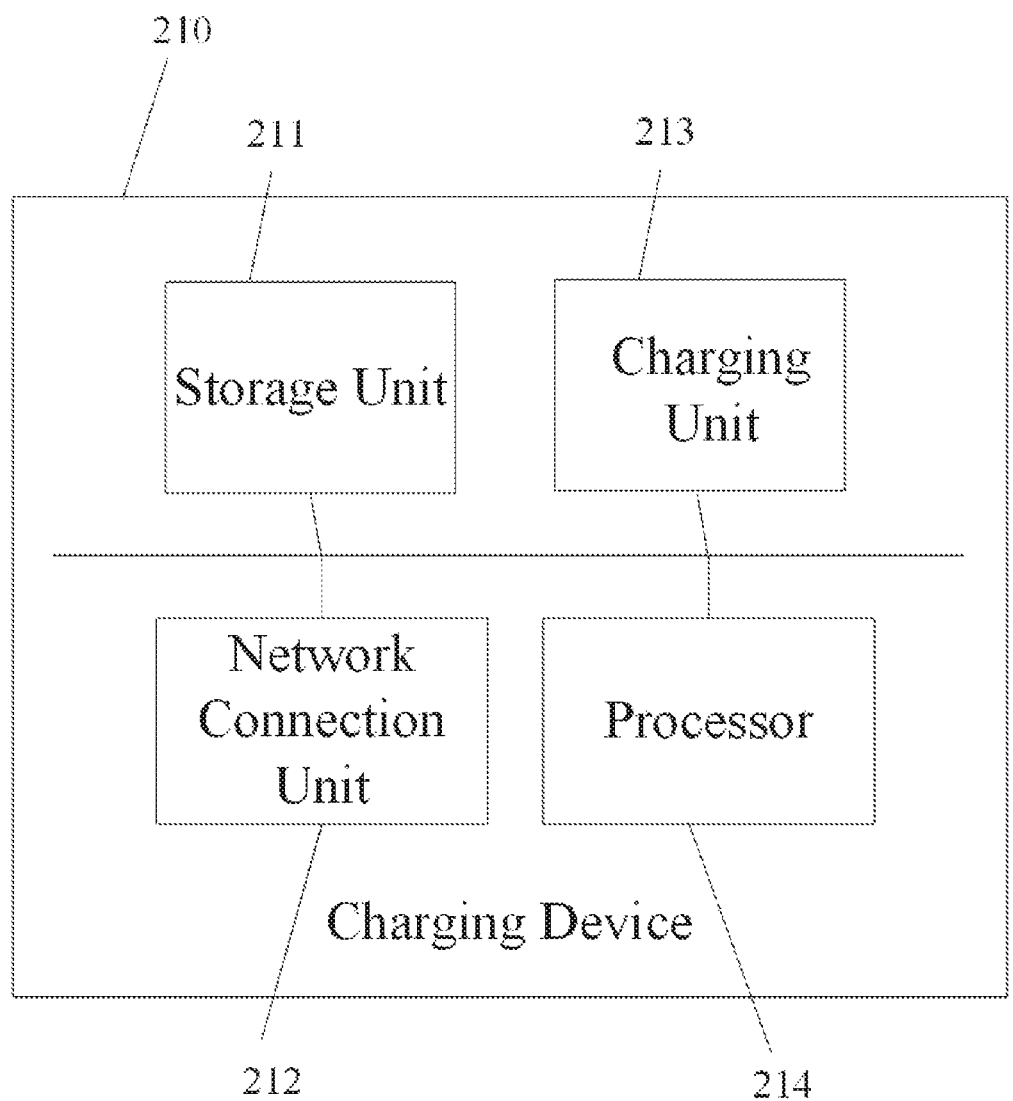
FIG. 2 is a schematic diagram illustrating an embodiment of a charging device of the invention.

FIG. 2 is a schematic diagram illustrating an embodiment of a charging device of the invention. The charging device 210 shown in FIG. 2 can be applied to the environment of FIG. 1, wherein the charging device 210 has the function of network connection in order to receive, download or update the various parameters and information required for charging management and automatic troubleshooting operations and it also has the processing computing ability to perform its own charging management operations and automatic troubleshooting procedure.

The charging device 210 at least comprises a storage unit 211, a network connection unit 212, a processor 214, and a charging unit 213.

The storage unit 211 (e.g., a memory) can store and record related data, such as predetermined abnormal situation definitions and troubleshooting procedures corresponding to the predetermined abnormal situation definitions. It is noted that, above data is merely examples of the application, and the present invention is not limited thereto.

The network connection unit 212 can receive, download, or update various parameters and information required by the charging management operation and automatic troubleshooting procedure via a network, such as a wired network, a telecommunications network, and a wireless network, such as a Wi-Fi network. The network connection unit 212 is configured to enable the charging device 210 to remotely connect to the charging management server via the network, and it can receive charging instructions from the charging management server and download or update relevant data regarding the predetermined abnormal situation definitions and the troubleshooting procedures corresponding to the predetermined abnormal situation definitions from the charging management server.

The charging unit 213 includes a plurality of charging connectors (for example, charging cables) that meet the same charging interface specifications or different charging interface specifications, which are electrically connected to an electric vehicle, and start or stop outputting power to the electric vehicle according to instructions of the processor 214.

The processor 214 can control related operations of software and hardware in the charging device 210 to perform the automatic troubleshooting method of the invention according to the predetermined abnormal situation definitions and respective troubleshooting procedures stored in the storage unit 211, the details of which will be described later. For example, the processor 214 can be a general-purpose controller, a micro-control unit (MCU), a digital signal processor (DSP), or the like, which provides the function of data analyzing, processing, and computing. However, it is understood that the present invention is not limited thereto.

In an embodiment of the invention, the automatic troubleshooting method performed by the processor 214 is to detect an operation of the charging device and a troubleshooting procedure corresponding to a predetermined abnormal situation definition is automatically performed when an abnormal situation specified by the predetermined abnormal situation definition is detected. For example, the processor 214 detects the operation of the network connection unit, and when detecting that the network connection is interrupted, enables the network connection unit to perform a network connection establishment procedure to re-establish the network connection. When detecting that the network connection is interrupted and the network connection still has not been restored after the network connection unit 212 has performed the network connection establishment procedure, the processor 214 clears temporary network information of the network connection unit and then enables the network connection unit to reperform the network connection establishment procedure again after clearing the temporary network information of the network connection unit and also enable the charging device 210 to perform a rebooting procedure. Or, when detecting that the network connection is interrupted, it may first try to perform the network connection establishment procedure. After the network connection unit 212 has performed the network connection establishment procedure, if the network connection has not been restored, the processor 214 first clears the temporary network information of the network connection unit 212 and then enables the network connection unit to reperform the network connection establishment procedure again. If the network connection still has not been restored after the temporary network information of the network connection unit 212 has cleared and the network connection establishment procedure has reperformed, the processor 214 enables the charging device 210 to perform a rebooting procedure.

In an embodiment of the invention, when it is detected that the network connection is interrupted, if it is detected that the network connection unit 212 is overheated, the processor 214 performs the cooling procedure first and then enables the network connection unit 212 to perform the network connection establishment procedure to re-establish the network connection.

When the processor 214 detects that the network connection is not interrupted but the network connection unit 212 can't remotely connect to the charging management server, the network connection unit 212 is enabled to perform the server connection procedure to establish a connection with the charging management server.

When the processor 214 detects that the network connection is not interrupted while the network connection unit 212 can't remotely connect to the charging management server and the network connection unit 212 still can't remotely connect to the charging management server after the network connection unit has performed the server connection procedure, it clears the temporary network information of the network connection unit 212 first and then enables the network connection unit 212 to reperform the server connection procedure again after clearing the temporary network information of the network connection unit 212. Or, when it is detected that the network connection is not interrupted but the network connection unit 212 can't remotely connect to the charging management server 120 and if the network connection unit 212 still can't remotely connect to the charging management server after the network connection unit 212 has performed the server connection procedure, it enables the charging device 210 to perform a rebooting procedure.

Figure 3:
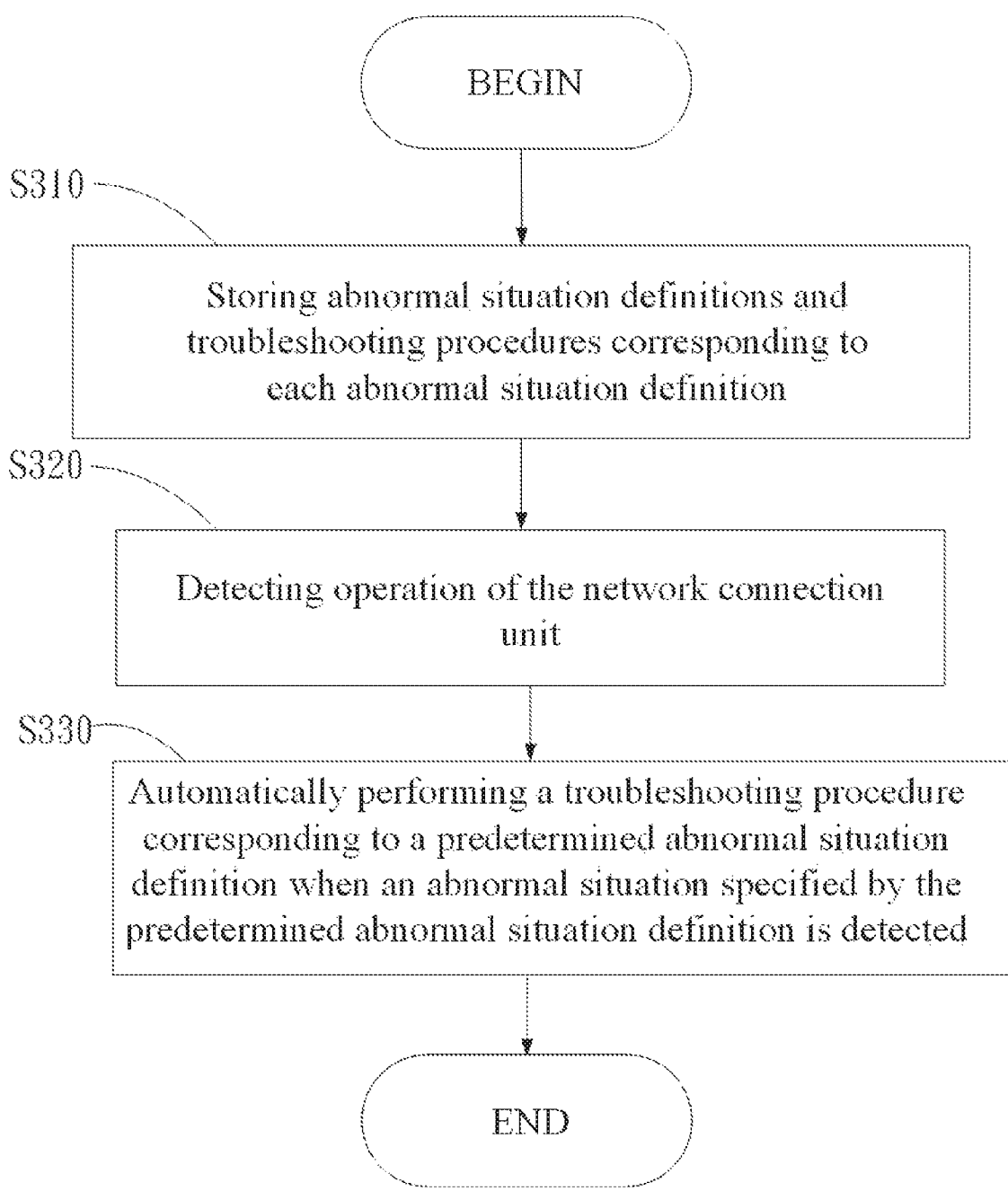
FIG. 3 is a flowchart of an embodiment of an automatic troubleshooting method of the invention.

FIG. 3 is a flowchart of an embodiment of an automatic troubleshooting method of the invention. The automatic troubleshooting method of the invention can be applied to the environment as shown in FIG. 1 and performed by the charging device as shown in FIG. 2.

First, in step S310, a plurality of abnormal situation definitions and the troubleshooting procedures corresponding to each abnormal situation definition are stored in the storage unit 211 in advance.

In step S320, the processor 214 detects the operation of the network connection unit 212, for example, the operation of the network connection unit 212 can be detected to confirm whether the network connection is normal and whether it can be remotely connected to the charging management server.

In step S330, when an abnormal situation specified by a predetermined abnormal situation definition is detected, a troubleshooting procedure corresponding to the predetermined abnormal situation definition is automatically performed.

Figure 4:
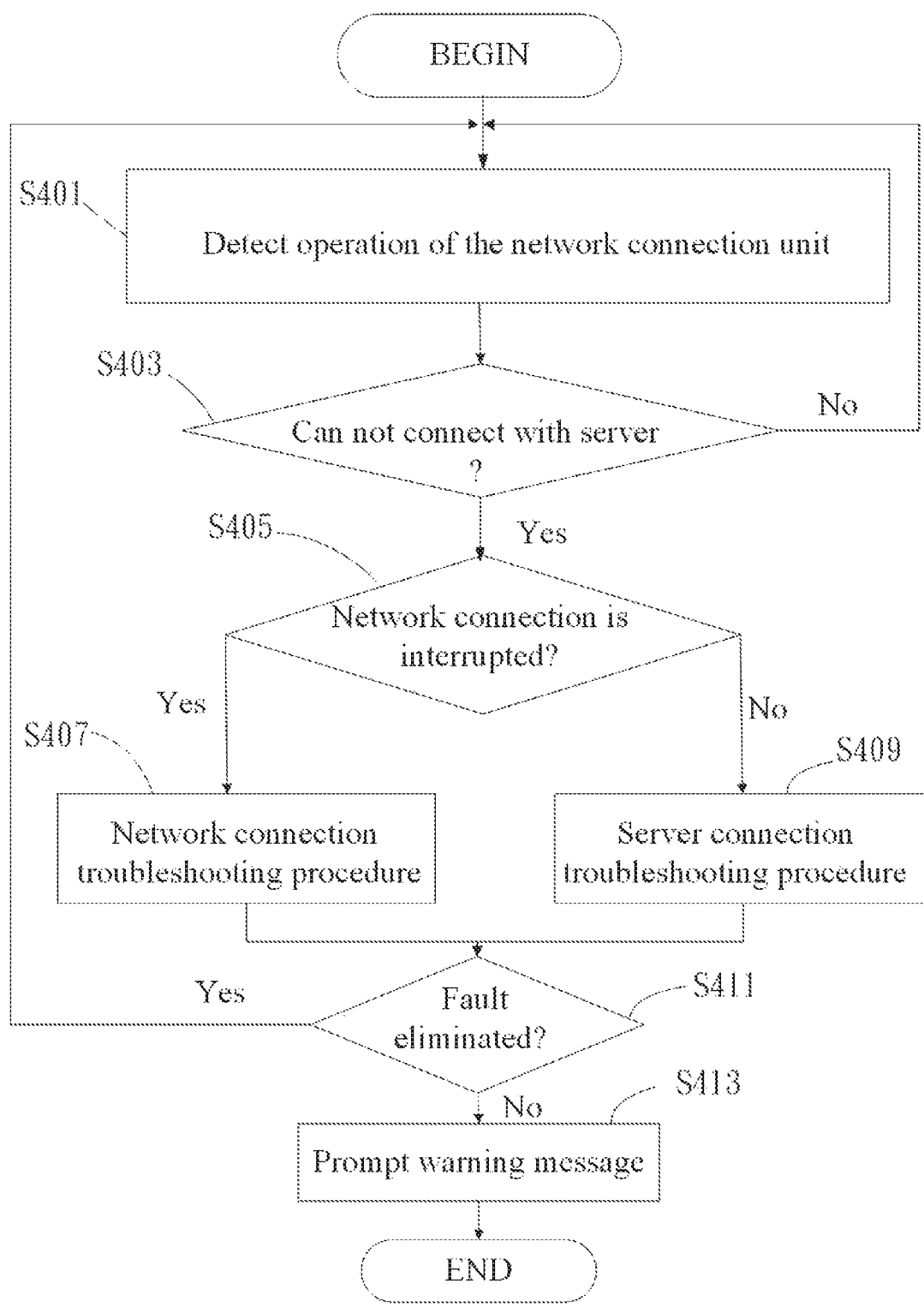
FIG. 4 is a flowchart of another embodiment of an automatic troubleshooting method of the invention.

For example, FIG. 4 is a flowchart of another embodiment of an automatic troubleshooting method of the invention.

In step S401, the processor 214 detects the operation of the network connection unit 212.

In step S403, it is determined whether a situation that it is not possible to remotely connect with the charging management server is detected. When it is detected the situation that it is not possible to remotely connect with the charging management server (Yes in step S403), then step S405 is performed; if it is not detected the situation that it is not possible to remotely connect with the charging management server (No in step S403), the flow returns to step S401 to periodically perform detection.

In step S405, it is determined whether the network connection is interrupted. When the connection interruption is detected (Yes in step S405), a corresponding network connection troubleshooting procedure is performed (step S407); when the connection interruption is not detected (No in step S405), a corresponding server connection troubleshooting procedure (step S409).

In the network connection troubleshooting procedure (step S407), various debugging methods can be performed to restore the network connection. For example, the network connection unit 212 can perform a network connection establishment procedure to re-establish the network connection. When detecting that the network connection is interrupted and the network connection still has not been restored after the network connection unit 212 has performed the network connection establishment procedure, temporary network information of the network connection unit can be cleared first and then the network connection unit 212 can be enabled to reperform the network connection establishment procedure again after clearing the temporary network information of the network connection unit and also the charging device 210 can be enabled to perform a rebooting procedure. Or, when detecting that the network connection is interrupted, it may first try to perform the network connection establishment procedure. After the network connection unit 212 has performed the network connection establishment procedure, if the network connection has not been restored, the temporary network information of the network connection unit 212 is cleared and the network connection unit 212 is enabled to reperform the network connection establishment procedure again. If the network connection still has not been restored after the temporary network information of the network connection unit 212 has cleared and the network connection establishment procedure has reperformed, the charging device 210 can be enabled to perform a rebooting procedure.

In an embodiment of the invention, when it is detected that the network connection is interrupted, if it is detected that the network connection unit 212 is overheated, the processor 214 can perform the cooling procedure first and then enables the network connection unit 212 to perform the network connection establishment procedure to re-establish the network connection.

In the server connection troubleshooting procedure (step S409), various debugging methods can be performed to restore the network connection with the charging management server. For example, when the processor 214 detects that the network connection is not interrupted but the network connection unit 212 can't remotely connect to the charging management server, the network connection unit 212 can be enabled to perform the server connection procedure to establish a connection with the charging management server. When the processor 214 detects that the network connection is not interrupted while the network connection unit 212 can't remotely connect to the charging management server and the network connection unit 212 still can't remotely connect to the charging management server after the network connection unit 212 has performed the server connection procedure, the temporary network information of the network connection unit 212 can be cleared and the network connection unit 212 can then be enabled to reperform the server connection procedure again after clearing the temporary network information of the network connection unit 212. Or, when it is detected that the network connection is not interrupted but the network connection unit 212 can't remotely connect to the charging management server 120 and if the network connection unit 212 still can't remotely connect to the charging management server after the network connection unit 212 has performed the server connection procedure, the charging device 210 can be enabled to perform a rebooting procedure. Or, when detecting that the network connection is not interrupted while the network connection unit 212 can't remotely connect to the charging management server, the network connection unit 212 can be enabled to perform the server connection procedure first and if the network connection unit 212 still can't remotely connect to the charging management server after the server connection procedure has performed, the temporary network information of the network connection unit 212 can be cleared and then the network connection unit can be enabled to reperform the network connection establishment procedure again. The charging device 210 will be enabled to perform a rebooting procedure only if the network connection still has not been restored after the temporary network information of the network connection unit 212 has cleared and the network connection establishment procedure has reperformed.

In step S411, it is confirmed whether the fault has been eliminated. If the fault has been successfully eliminated, the flow returns to step S401 for periodical detection; if the fault is not successfully eliminated, step S413 is performed to prompt a warning message. For example, a display panel or light signal of the charging device can be used to prompt the user or repairer that the network connection of the charging device is malfunctioning.

Therefore, the automatic troubleshooting methods of the present invention can enable the charging device to detect the network interruption and other fault conditions by itself, and the charging device can automatically eliminate the network interruption and other fault conditions by itself when a network connection between the charging device and a server is interrupted, such that the charging device can return to normal operation, and the situation that the maintenance personnel actually arrive at the charging station for troubleshooting can be greatly reduced. It can greatly reduce the need to actually send personnel to the charging station for troubleshooting, thus shortening the stopping service time for the charging device, reducing the maintenance cost and increasing the convenience of use.

Automatic troubleshooting methods, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. An automatic troubleshooting method for a charging device of an electric vehicle, comprising:
   detecting an operation of the charging device; and
   when an abnormal situation specified by a predetermined abnormal situation definition is detected, automatically performing a troubleshooting procedure corresponding to the predetermined abnormal situation definition,
   wherein the charging device further comprises a network connection unit, which is configured to enable the charging device to remotely connect to a charging management server via a network connection;
   wherein the method further comprises detecting the operation of the network connection unit, and when detecting that the network connection is interrupted, enabling the charging device to perform a cooling procedure first and then enabling the network connection unit to perform a network connection establishment procedure to re-establish the network connection.

2. The automatic troubleshooting method of claim 1, wherein
   the method further comprises detecting the operation of the network connection unit, and when detecting that the network connection is interrupted, enabling the network connection unit to perform a network connection establishment procedure to re-establish the network connection.

3. The automatic troubleshooting method of claim 2, wherein the method further comprises when detecting that the network connection is interrupted and the network connection has not been restored after the network connection unit has performed the network connection establishment procedure, clearing temporary network information of the network connection unit and enabling the network connection unit to perform the network connection establishment procedure again after clearing the temporary network information of the network connection unit.

4. A charging device of electric vehicles, which performs the automatic troubleshooting method as claim 3.

5. The automatic troubleshooting method of claim 2, wherein the method further comprises when detecting that the network connection is interrupted and the network connection has not been restored after the network connection unit has performed the network connection establishment procedure, enabling the charging device to perform a rebooting procedure.

6. A charging device of electric vehicles, which performs the automatic troubleshooting method as claim 5.

7. A charging device of electric vehicles, which performs the automatic troubleshooting method as claim 2.

8. The automatic troubleshooting method of claim 1, wherein
   the method further comprises detecting the operation of the network connection unit, and when detecting that the network connection is not interrupted but the network connection unit can't be remotely connected to the charging management server, enabling the network connection unit to perform a server connection procedure to establish a connection with the charging management server.

9. The automatic troubleshooting method of claim 8, wherein the method further comprises detecting the operation of the network connection unit, and when detecting that the network connection is not interrupted and the network connection unit still can't be remotely connected to the charging management server after the network connection unit has performed the server connection procedure, clearing temporary network information of the network connection unit and enabling the network connection unit to reperform the server connection procedure again to establish the connection with the charging management server after clearing the temporary network information of the network connection unit.

10. A charging device of electric vehicles, which performs the automatic troubleshooting method as claim 9.

11. The automatic troubleshooting method of claim 8, wherein when detecting that the network connection is not interrupted and the network connection unit still can't be remotely connected to the charging management server after the network connection unit has performed the server connection procedure, rebooting the charging device.

12. A charging device of electric vehicles, which performs the automatic troubleshooting method as claim 11.

13. A charging device of electric vehicles, which performs the automatic troubleshooting method as claim 8.

14. A charging device of electric vehicles, which performs the automatic troubleshooting method as claim 1.

\* \* \* \* \*